US006411999B1

United States Patent
Tinkler

(12) United States Patent
(10) Patent No.: US 6,411,999 B1
(45) Date of Patent: *Jun. 25, 2002

(54) COMPUTER SYSTEM FOR SUPPORTING A WEBSITE

(75) Inventor: Simon Paul Tinkler, Kingston upon Thames (GB)

(73) Assignee: International Computers Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/169,326

(22) Filed: Oct. 8, 1998

(30) Foreign Application Priority Data

Oct. 11, 1997 (GB) ............................................. 9721502

(51) Int. Cl.⁷ ............................................... G06F 13/00
(52) U.S. Cl. ...................................... 709/224; 709/217
(58) Field of Search ............................... 709/202, 201, 709/224, 203, 218, 217; 705/27, 103; 707/103, 232, 513, 10, 9; 345/357, 329

(56) References Cited

U.S. PATENT DOCUMENTS

| | | | | |
|---|---|---|---|---|
| 5,761,418 A | * | 6/1998 | Francis et al. ............... 709/201 |
| 5,796,393 A | * | 8/1998 | MacNaughton et al. .... 345/329 |
| 5,877,766 A | * | 3/1999 | Bates et al. .................. 345/357 |
| 5,901,286 A | * | 5/1999 | Danknick et al. ............ 709/203 |
| 5,933,827 A | * | 8/1999 | Cole et al. ..................... 707/10 |
| 5,973,696 A | * | 10/1999 | Agranat et al. .............. 345/357 |
| 6,003,037 A | * | 12/1999 | Kassabgi et al. ............ 707/103 |
| 6,003,040 A | * | 12/1999 | Mital et al. .................. 707/103 |
| 6,003,047 A | * | 12/1999 | Osmond et al. ............. 707/513 |
| 6,014,666 A | * | 1/2000 | Helland et al. ................. 707/9 |
| 6,020,884 A | * | 2/2000 | MacNaughton et al. .... 345/329 |
| 6,034,689 A | * | 3/2000 | White et al. ................. 345/357 |
| 6,035,330 A | * | 3/2000 | Astiz et al. .................. 709/218 |
| 6,047,327 A | * | 4/2000 | Tso et al. ..................... 709/232 |
| 6,055,515 A | * | 4/2000 | Consentino et al. .......... 705/27 |
| 6,055,541 A | * | 4/2000 | Solecki et al. .............. 705/103 |
| 6,055,570 A | * | 4/2000 | Nielsen ........................ 709/224 |
| 6,141,660 A | * | 10/2000 | Bach et al. .................. 707/103 |
| 6,185,587 B1 | * | 2/2001 | Bernardo et al. ........... 707/513 |

* cited by examiner

*Primary Examiner*—David Wiley
(74) *Attorney, Agent, or Firm*—Lee, Mann, Smith, McWilliams, Sweeney & Ohlson

(57) ABSTRACT

A computer system for supporting a website, comprises a navigation object table defining a number of navigation objects, representing a tree-like navigational structure, and an object handler which uses the table dynamically to construct menus allowing a user to navigate through the navigational structure. Whenever the object handler is called, it is passed a tag identifying an object. It then searches the navigation object table to find objects whose parent object in the tree structure is the object identified by this tag, using these objects to construct the menu. The navigation objects include menu objects specifying subsidiary menus in the tree structure, and selection of one of the menu objects causes a recursive call to the object handler, passing it the tag of the menu object. The system also includes an access control table indicating which users may access which navigation objects, and the object handler uses this access control table to tailor the menus for particular users.

18 Claims, 5 Drawing Sheets

NAVIGATION OBJECT TABLE

| TAG | NAME | TYPE | ACTIVE | PARENT |
|---|---|---|---|---|
| TEC001 | useful websites | MENU | T | TEC |
| TEC002 | skills database | ASP | T | TEC |
| TEC003 | information | HTML | T | TEC |
| TEC001001 | Microsoft | LINK | T | TEC001 |
| TEC001002 | Oracle | LINK | T | TEC001 |

ASP OBJECT TABLE

| TAG | FILENAME |
|---|---|
| TEC002 | skills.asp |

LINK OBJECT TABLE

| TAG | ADDRESS |
|---|---|
| TEC001001 | http://www.microsoft.com |
| TEC001002 | htttp://www.oracle.com |

HTML OBJECT TABLE

| PARENT | FILENAME | NAME |
|---|---|---|
| TEC003 | cap.htm | Capabilities |
| TEC003 | prod.htm | Products |

FIG. 2

COMPUTER SYSTEM FOR SUPPORTING A WEBSITE

BACKGROUND OF THE INVENTION

This invention relates to a computer system for supporting a website on the Internet or on an intranet.

Normally, a website consists of a number of pages, linked together by means of hyperlinks, allowing a user to navigate around from one page to another. However, a problem with this is that, when pages are created or updated, it is very difficult to ensure that all the necessary links are correctly updated in a consistent manner. For example, if a file is moved to a different location, all links to the file must be changed so that they now point to the new location. The object of the present invention is to provide a way of overcoming or alleviating this problem.

Websites are frequently used to provide information and services to employees of an organisation, to enable them to carry out their jobs more effectively. However, if a website is large, and contains a large amount of information not relevant to a particular employee's job, it can be difficult for the employee to locate the information he or she requires. An object of a preferred form of the present invention is to provide a way of overcoming or alleviating this problem.

SUMMARY OF THE INVENTION

According to the invention a computer system for supporting a website comprises:

(a) a navigation object table defining a plurality of navigation objects representing a navigational structure for navigating around the website; and (b) an object handler for using said navigation table dynamically to construct menus allowing a user to navigate through said navigational structure.

As will be shown, the invention enables the structure of the website to be modified, simply by altering the contents of the navigation object table, without having to alter links in the website pages.

In a preferred form of the invention, the system also includes an access control table indicating which users may access which navigation objects, and wherein the object handler uses this access control table to tailor the menus for particular users.

BRIEF DESCRIPTION OF THE DRAWINGS

FIG. 2 is a schematic diagram showing the structure of a set of object tables used in the computer system.

DESCRIPTION OF AN EMBODIMENT OF THE INVENTION

One embodiment of the invention will now be described by way of example with reference to the accompanying drawings.

Overview

Figure 1:
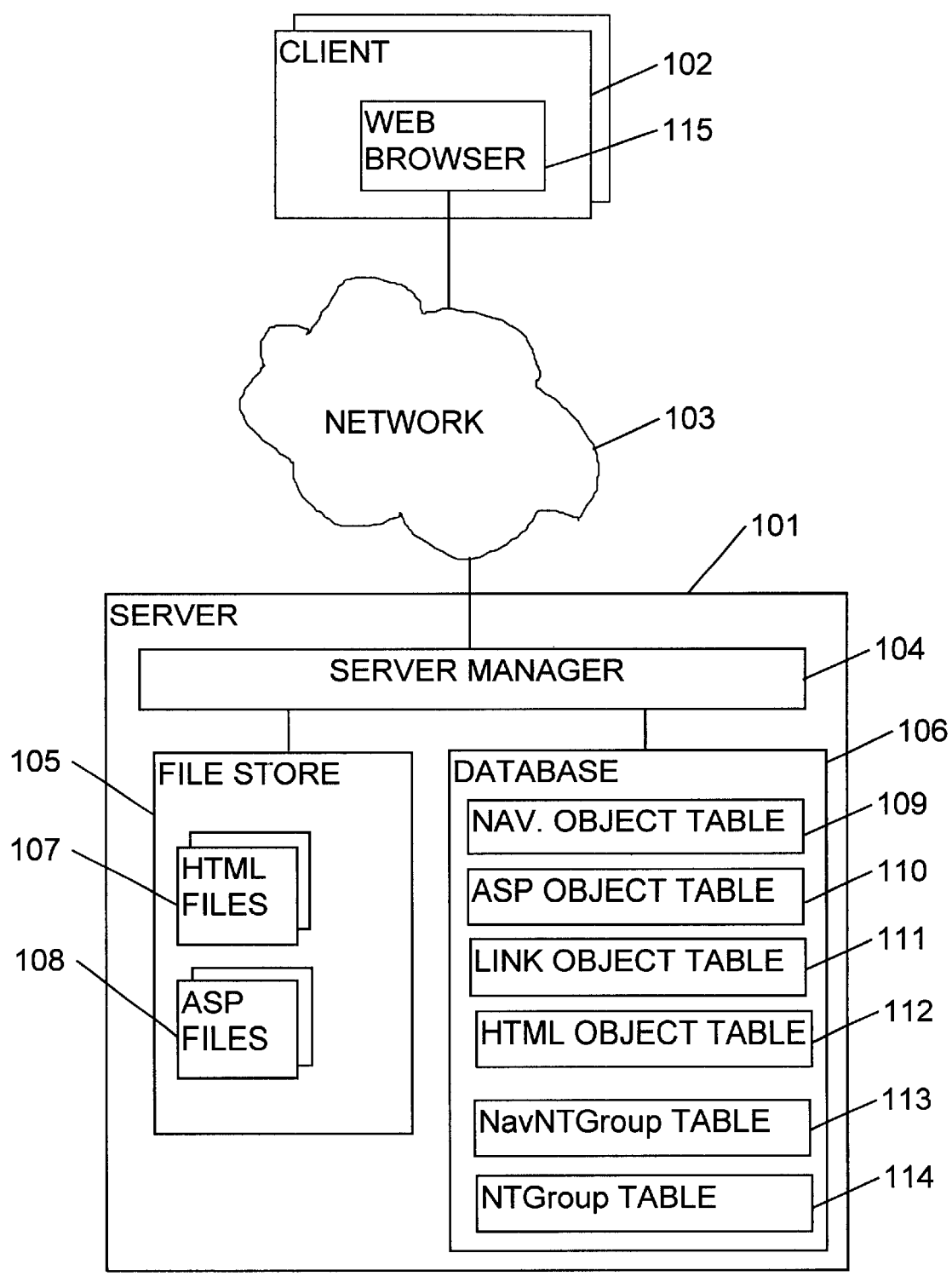
FIG. 1 is a block diagram of an intranet, including a computer system in accordance with the present invention.

FIG. 1 shows an intranet system, comprising a server computer 101, and a number of client computers 102, interconnected by means of a network 103.

The server computer 101 runs a server manager 104, and includes a file store 105 and a database 106. In this example, the server computer runs under the Microsoft Windows NT Version 4 operating system, the server manager is Microsoft Internet Information Server (IIS) version 3.00, while the database is provided by Microsoft SQL Server version 6.5.

The server computer maintains a website, comprising a large number of pages, held in the file store 105. These pages include HTML (Hypertext Markup Language) files 107, and ASP (Active Server Page) files 108. An ASP file is an example of a script file, running under an interpreter, which can perform various functions when called. For example, an ASP file may contain embedded SQL queries, for accessing the database.

Each of the client computers 102 includes a web browser 115 which, in this example, is Microsoft Internet Explorer.

Figure 3:
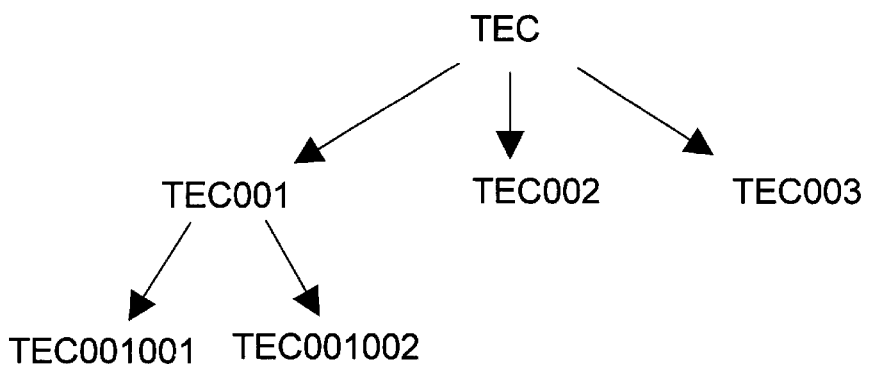
FIG. 3 is a schematic diagram showing the tree structure of navigational objects defined by the object tables.

The navigational structure of the website is represented by a number of navigation objects, arranged in a tree structure. These objects are defined by a set of object tables, held in the database 106. These object tables comprise: Navigation Object Table 109, ASP Object Table 110, Link Object Table 111, and HTML Object Table 112. FIG. 2 shows a simplified example of these tables, while FIG. 3 shows the corresponding tree structure.

Navigation Object Table

The navigation object table 109 holds an entry for each navigation object. Each entry contains the following fields:

TAG An identifying tag value. The TAG field of each object is formed by adding three digits to the tag value of its parent object in the tree structure. For example, the object TEC001 is the parent of objects TEC001001 and TEC001002.

NAME Text for display on a link.

TYPE In the present example, the following object types are defined, although it should be appreciated that other types may also be defined:
MENU Menu.
ASP ASP (Active Server Page).
LINK A link to another website.
HTML HTML (Hypertext Markup Language).

ACTIVE "True" if the object is currently active.

PARENT The tag of the parent object in the tree structure. (This field is not strictly necessary, since it can be deduced from the TAG value).

ASP Object Table

The ASP Object Table 110 holds an entry for each ASP file that can be accessed via the navigational structure. Each entry contains the following fields:

TAG A tag value which relates the entry to an ASP object in the Navigation Object Table.

FILENAME The file name of the ASP file.

Link Object Table

The Link Object Table 111 holds an entry for each remote website that can be accessed via the navigational structure. Each entry contains the following fields:

TAG A tag value which relates the entry to a LINK object in the Navigation Object Table.

ADDRESS The full HTTP address of the remote website.

HTML Object Table

The HTML Object Table 112 holds an entry for each HTML file that can be accessed via the navigational structure. Each entry contains the following fields:

PARENT A tag value which relates the entry to an HTML object in the Navigation Object Table.

FILENAME The file name of the HTML file.

NAME Text for display on a link.

It should be noted that several entries in the HTML Object Table may share the same PARENT value. This allows a group of HTML files to be represented by a single entry in the Navigation Object Table.

Access Control Tables

The database also holds two access control tables: NavNTGroup table 113, and NTGroup Table 114. These tables are used to control the way in which individual users can access given navigation objects.

The NavNTGroup table 113 associates navigation objects with groups which are permitted to access those objects. This table contains the following fields:

TAG A tag value, identifying a navigation object.

NTGROUP An NT group name.

A given tag value may be associated with more than one NT group, allowing more than one group of users to access a particular navigation object.

By default, if no entry appears for a particular tag value, the corresponding navigation object can be accessed by any group.

The NTGroup table 114 associates users with specific groups. This table contains the following fields:

USERNAME A username.

NTGROUP An NT group name.

A given username may be associated with several different groups.

User Attachment to the Website

A user can attach to the website by entering the web address of the website into the browser 115. The browser will then contact the server manager 104, to inform it that the user is attaching to the website.

Figure 4:
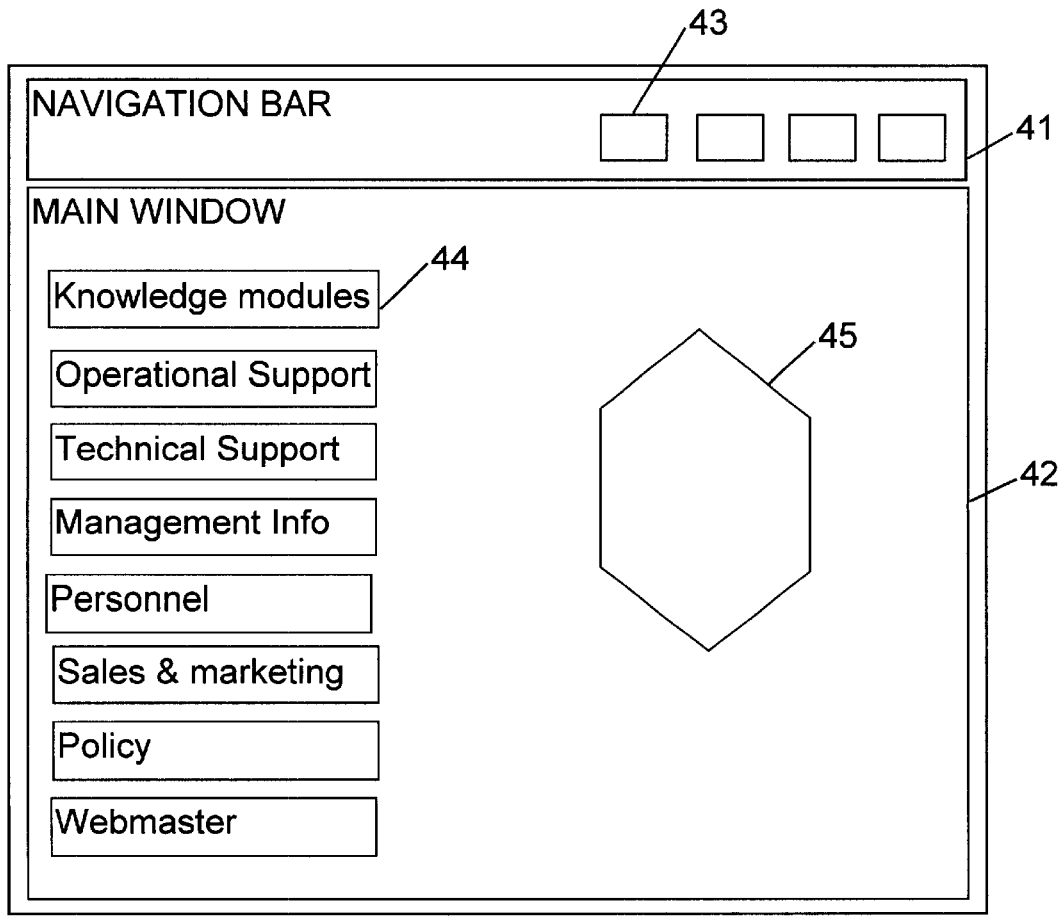
FIG. 4 is a diagram illustrating the format of a home page screen display produced by the system.

When the user attaches to the website, a file DEFAULT.HTM is automatically loaded by the server manager. This is a static HTML file which sets up two frames on the user's screen. As shown in FIG. 4, these two frames comprise a navigation bar 41 and a main window 42. The navigation bar 41 consists of an area running horizontally across the top of the screen, while the main window consists of the remainder of the screen. DEFAULT.HTM simply composes these two frames; the content of the frames is built by calling two further files NAVBAR.HTM and MAINHARD.ASP.

NAVBAR.HTM is a static HTML file. It paints the navigation bar 41, setting up a number of navigation buttons 43 in this bar.

MAINHARD.ASP paints the main window 42 for the home page of the website. As shown in FIG. 4, this includes a number of zone buttons 44, representing the top-level zones of the site. The main window may also include a graphic 45, such as a company logo.

The home page also includes a button which activates a script which performs a user log-in procedure with the server, allowing the server to obtain the user's username.

Zone Buttons

Each of the zone buttons has a tag associated with it. For example, the following zone buttons may be provided, with tags as shown:

| Zone | Tag |
|---|---|
| Knowledge Modules | KNO |
| Operational support | OPS |

-continued

| Zone | Tag |
|---|---|
| Technical Support | TEC |
| Management Information | MAN |
| Personnel and Development | PDI |
| Sales and Marketing | SAM |
| Policy | POL |
| Webmaster | WEB |

The zone buttons 44 form the highest level of the navigational tree, and are the parents of the top-level objects in the Navigation Object table. For example, it can be seen that in FIG. 2, the "Technical support" zone button (TEC) is the parent of the first three items in the Navigation Object table.

Whenever one of the zone buttons is selected by the user, MAINHARD.ASP calls an object handler, HANDLE_OBJECT.ASP, passing it the tag associated with that button.

Object Handler

Figure 5:
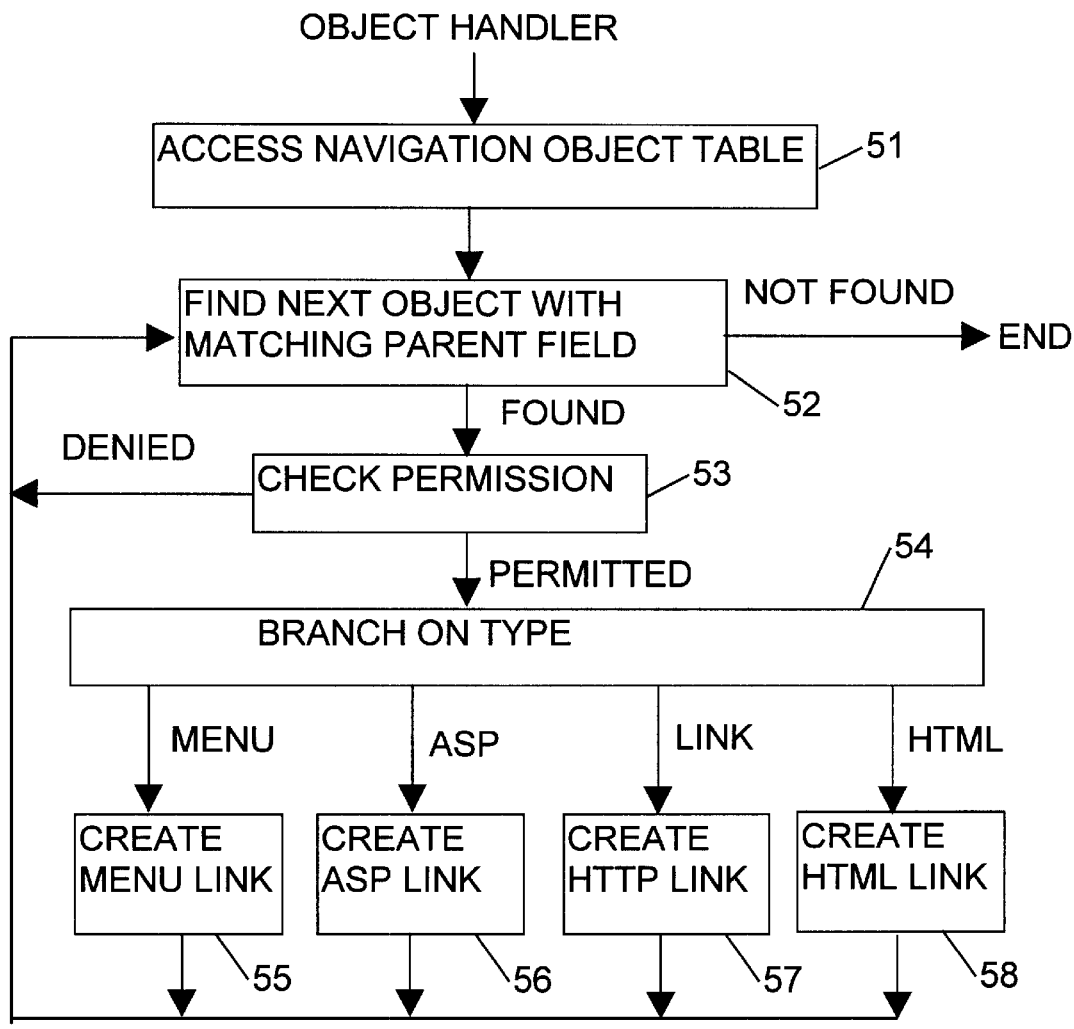
FIG. 5 is a flow chart showing the operation of an object handler forming part of the website.

FIG. 5 shows the operation of the object handler when it is called from MAINHARD.ASP, or recursively called by itself.

(Step 51) The object handler accesses the navigation object table in the database.

(Step 52) The object handler searches for the next navigation object in the navigation object table whose PARENT field matches the tag value passed to the object handler when it was called. If no matching object can be found, the object handler terminates.

(Step 53) If a matching object is found, the object handler then consults the access control tables NavNTGroup and NTGroup, to check whether the current user is a member of a group which is permitted to access this navigation object. If access is not permitted, the object handler returns to step 52 above.

(Step 54) Assuming that access is permitted, the object handler then branches according to the TYPE field of the navigation object.

(Step 55) If the navigation object is of the MENU type, the object handler creates a link in the main window 42, using the NAME field of the navigation object as the label for the link, and associating the TAG value of the navigation object with this link. If this link is selected by the user, the object handler will recursively call itself, passing itself the associated TAG value.

(Step 56) If the navigation object is of the ASP type, the object handler accesses the ASP Object Table, to find the entry whose TAG matches that of the navigation object, and reads the FILENAME field of this entry. The object handler then creates a link to this FILENAME in the main window 42 , using the NAME field of the navigation object as the label for the link.

(Step 57) If the navigation object is of the LINK type, the object handler accesses the Link Object Table, to find the entry whose TAG matches that of the navigation object, and reads the ADDRESS field of this entry. The object handler then creates a link to this ADDRESS in the main window 42, using the NAME field of the navigation object as the label for the link.

(Step 58) If the navigation object is of the HTML type, the object handler accesses the HTML Object Table, and searches for each entry whose PARENT field matches the TAG value of the navigation object. For each matching entry in the HTML Object Table, the object handler reads the FILENAME field, and then creates a link to this FILENAME in the main window 42, using the NAME field from the HTML Object Table entry as the label for the link.

In each of the steps 55–58, if the navigation object has its ACTIVE field equal to "true", the link is displayed as an active link, conventionally in blue. On the other hand, if the navigation object has its ACTIVE field equal to "false", the link is displayed as an inactive link, conventionally in grey.

After performing any of steps 55–58, the object handler returns to step 52 above. The loop (steps 52–58) is then repeated until all matching objects have been processed.

It can be seen that, when called, the object handler dynamically builds a menu, consisting of a set of links, using the information contained in the object tables in the database. The links may provide access to particular files or websites, or may lead to a lower level menu.

Figure 6:
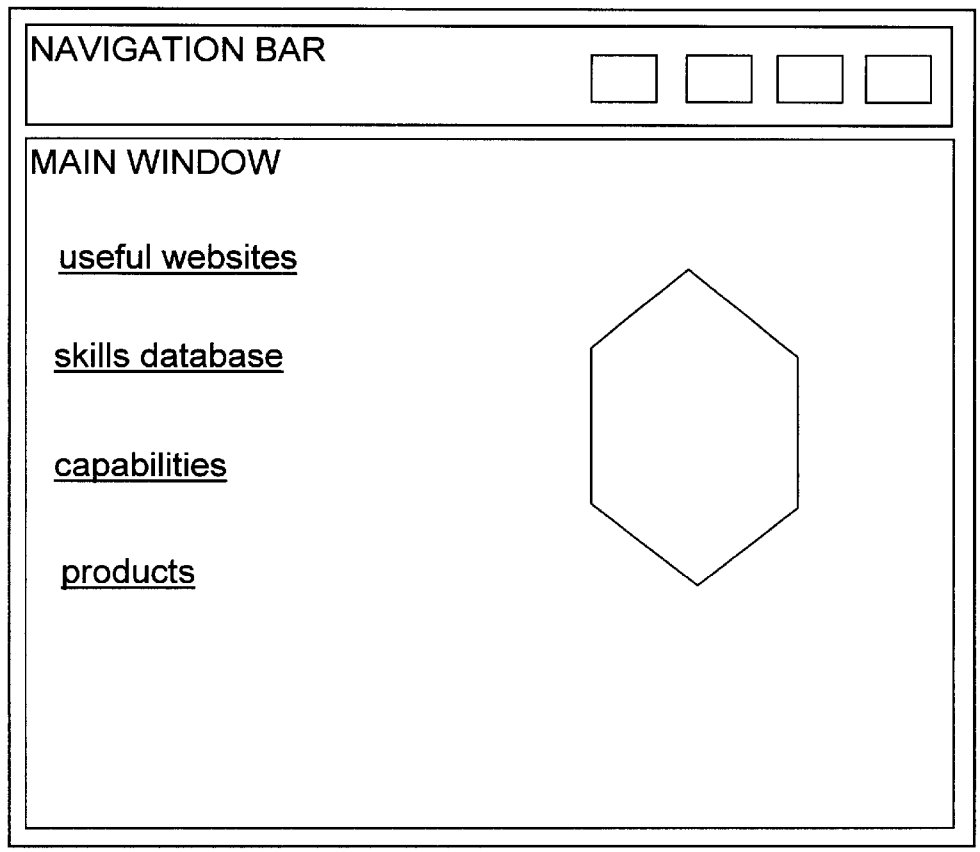
FIG. 6 is a diagram showing a screen display containing a menu dynamically constructed by the object handler.

For example, if the user selects the "Technical Support" zone button from the home page, the object handler will search the Navigation Object Table to find all entries whose PARENT field matches the tag value TEC of this button. In the example shown in FIG. 2, the first entry matches, and so the object handler will create a link with the text "useful websites", and the tag value TEC001. Similarly, the second entry matches, and so the object handler will also create a link to the file skills.asp with the text "skills database". The third entry also matches, and in this case the object handler will create two more links, one for each of the HTML files whose PARENT field matches the tag TEC003. Thus, the object handler builds a menu with four items, as shown in FIG. 6.

The user can then select any of the links in the menu. For example, if the user selects the "useful websites" link, the object handler will call itself recursively, passing itself the tag value TEC001. In response to this call, the object handler builds a further menu containing a set of links to remote websites. Alternatively, if the "skills database" link is selected, the skills.asp file is called, or if any of the HTML links is selected, the corresponding HTML file is called.

Discussion

It has been shown that the object handler, when called, dynamically builds a menu, using the information contained in the object tables in the database. The structure of the website can therefore easily be modified, simply by altering the contents of the object tables in the database. It is not necessary to alter links within the files themselves. This greatly eases the task of updating the website.

Each menu can be individually tailored to the user, by means of the access control tables, so as to contain only those items that are relevant to the particular user's job. However, the user still has the ability gain access to resources in the conventional manner, by using the GO function of the browser, bypassing the navigational structure provided by the object tables. This is useful in cases where the user normally works within a fixed set of information, but may occasionally require to access other resources.

As described above, the server obtains the user's username through a log-in procedure. If this procedure is not performed, a default username is assumed. This default username allows access only to a default subset of resources.

Some Possible Modifications

It will be appreciated that many modifications may be made to the system described above without departing from the scope of the present invention. For example, other types of navigation object may be defined. Also, although the above example was described in the context of an intranet, it will be appreciated that the invention could also be employed for Internet access.

Although the embodiment of the invention described above was implemented using Microsoft technology, it will be appreciated that this is not essential to the invention, and other embodiments of the invention may be implemented using different technology.

What is claimed is:

1. A computer system comprising:
   (a) a web server hosting a website comprising a plurality of web pages;
   (b) a navigation object table defining a plurality of navigation objects representing a navigational structure for said website; and
   (c) an object handler for using said navigation table in response to a user action, to dynamically construct a menu comprising a series of links to said web pages, allowing a user to navigate around said website.

2. A computer system according to claim 1 wherein each of said navigation objects in said navigation object table includes a parent field for identifying a parent navigation object in said hierarchical navigation structure, and wherein said object handler includes:
   (a) means for searching the navigation object table to find navigation objects whose parent field matches a specified value; and
   (b) means for using the navigation objects so found to construct a menu.

3. A computer system according to claim 1 further including:
   (a) an access control table indicating which users may access which navigation objects; and
   (b) means for using said access control table to tailor the menus for particular users.

4. A computer system according to any preceding claim wherein said navigation objects include HTML objects specifying links to HTML files.

5. A computer system according to any preceding claim wherein said navigation objects include script objects specifying links to script files.

6. A computer system according to any preceding claim wherein said navigation objects include link objects specifying links to remote websites.

7. A method of operating a computer system, the method comprising:
   (a) creating a website comprising a plurality of web pages hosted on a web server;
   (b) creating a navigation object table defining a plurality of navigation objects representing a navigational structure for said website; and
   (c) in response to a user action, using said navigation table to dynamically construct a menu comprising a series of links to said web pages, allowing a user to navigate around said website.

8. A method according to claim 7 including the steps:
   (a) providing in each of said navigation objects in said navigation object table a parent field identifying a parent navigation object in said hierarchical navigation structure;
   (b) searching the navigation object table to find navigation objects whose parent field matches a specified value; and
   (c) using the navigation objects so found to construct a menu.

9. A method according to claim 8 including the steps:
   (a) providing an access control table indicating which users may access which navigation objects; and
   (b) using said access control table to tailor the menus for particular users.

10. An information carrier, holding a program for performing a method according to claim 8.

11. A computer system comprising:
   (a) a web server hosting a website comprising a plurality of web pages;
   (b) a navigation object table defining a plurality of navigation objects representing a hierarchical navigational structure for said website, each of said navigation objects having a type field identifying the navigation object as being of one of a plurality of types including a menu type; and
   (c) an object handler for using said navigation table in response to a user action to dynamically construct a menu comprising a plurality of selectable menu items, at least one of said menu items representing a lower-level menu in said hierarchical navigation structure; and
   (d) means for calling said object handler when a user selects said menu item representing a lower-level menu, to dynamically construct said lower-level menu using said navigation table.

12. A computer system according to claim 11 wherein each of said navigation objects in said navigation object table includes a parent field for identifying a parent navigation object in said hierarchical navigation structure, and wherein said object handler includes:
   (a) means for searching the navigation object table to find navigation objects whose parent field matches a specified value; and
   (b) means for using the navigation objects so found to construct menu.

13. A method of operating a computer system, the method comprising:
   (a) creating a website comprising a plurality of web pages hosted on a web server;
   (b) creating a navigation object table defining a plurality of navigation objects representing a hierarchical navigational structure for said website, each of said navigation objects having a type field identifying the navigation object as being of one of a plurality of types including a menu type;
   (c) in response to a user action, using said navigation table to dynamically construct a menu comprising a plurality of selectable menu items, at least one of said menu items representing a lower-level menu in said hierarchical navigation structure; and
   (d) when a user selects said menu item representing a lower-level menu, using said navigation table to dynamically construct said lower-level menu.

14. A method according to claim 13 including the steps:
   (a) providing in each of said navigation objects in said navigation object table a parent field identifying a parent navigation object in said hierarchical navigation structure;
   (b) searching the navigation object table to find navigation objects whose parent field matches a specified value; and
   (c) using the navigation objects so found to construct a menu.

15. A computer system comprising:
   (a) a web server hosting a website comprising a plurality of web pages;
   (b) a navigation table defining a plurality of navigation objects representing a hierarchical navigational structure for said website, said navigation objects having respective parent fields defining said hierarchical navigation structure;
   (c) means for displaying to a user a menu comprising a plurality of menu items, each of said menu items having a tag;
   (d) means responsive to the user selecting one of said menu items, for searching the navigation table to find navigation objects whose parent fields match the tag of the selected menu item; and
   (e) means for creating a further menu, comprising a series of further menu items derived from the navigation objects found by searching the navigation table.

16. A computer system according to claim 15 wherein said further menu items include links to said web pages.

17. A method of operating a computer system, the method comprising:
   (a) creating a website comprising a plurality of web pages hosted on a web server computer;
   (b) creating a navigation table defining a plurality of navigation objects representing a hierarchical navigational structure for said website, said navigation objects having respective parent fields defining said hierarchical navigation structure;
   (c) displaying to a user a menu comprising a plurality of menu items, each of said menu items having a tag;
   (d) in response to the user selecting one of said menu items, searching the navigation table to find navigation objects whose parent fields match the tag of the selected menu item; and
   (e) creating a further menu, comprising a series of further menu items derived from the navigation objects found by searching the navigation table.

18. A method according to claim 17 wherein said further menu items include links to said web pages.

* * * * *